(12) United States Patent
Apel et al.

(10) Patent No.: US 6,194,894 B1
(45) Date of Patent: Feb. 27, 2001

(54) ROTATION ANGULAR SENSOR WITH METAL-INJECTION MOLDED MAGNET HOLDER

(75) Inventors: Peter Apel, Suedkirchen; Marion Hauschopp, Werne, both of (DE)

(73) Assignee: AB Eletronik GmbH, Werne (DE)

( * ) Notice: Subject to any disclaimer, the term of this patent is extended or adjusted under 35 U.S.C. 154(b) by 0 days.

(21) Appl. No.: 09/101,913

(22) PCT Filed: Dec. 3, 1997

(86) PCT No.: PCT/EP97/06758

§ 371 Date: Dec. 14, 1998

§ 102(e) Date: Dec. 14, 1998

(87) PCT Pub. No.: WO98/25102

PCT Pub. Date: Jun. 11, 1998

(30) Foreign Application Priority Data

Dec. 4, 1996 (DE) .......................................... 296 21 018 U
Dec. 4, 1996 (DE) .......................................... 296 21 016 U
Jan. 23, 1997 (DE) .......................................... 297 01 129 U (51) Int. Cl.[7] ................. G01B 7/30; G01D 5/14
(52) U.S. Cl. .................. 324/207.25; 324/207.2; 29/595
(58) Field of Search ............... 324/207.2, 207.21, 324/207.25, 251, 252, 173, 174; 73/DIG. 3; 123/406.52, 406.58, 617; 29/595, 598; 310/42, 43

(56) References Cited

U.S. PATENT DOCUMENTS 5,332,965 * 7/1994 Wolf et al. ................. 324/207.2 X
5,544,000 * 8/1996 Suzuki et al. .............. 324/207.2 X
5,861,745 * 1/1999 Herden ...................... 324/207.2

FOREIGN PATENT DOCUMENTS

WO9514911 6/1995 (WO).

* cited by examiner

Primary Examiner—Gerard Strecker
(74) Attorney, Agent, or Firm—Milde, Hoffberg & Macklin, LLP (57) ABSTRACT

To make it possible for a rotation angle sensor to be manufactured and assembled more easily and more accurately, the part components of a stator element (21) made of a ferritic material are held in a sintered stator body, made by a sintering technique, by at least one holding element in a holding recess of a base element made of a non-magnetizable material. A magnetic holding device (26, 27) is a holding element made by a metal injection moulding (MIM) technique with an at least partly formed magnetic isolation zone and at least one recess. An annular magnetic element (24) is attached inside the MIM holding device by means of at least one slit-shaped recess and at least one compatible linking element, and positioned at a given angle ($\alpha$) in relation to a gap, between the sintered stator bodies.

17 Claims, 6 Drawing Sheets

ROTATION ANGULAR SENSOR WITH METAL-INJECTION MOLDED MAGNET HOLDER

BACKGROUND OF THE INVENTION

The present invention concerns an angle-of-rotation sensor with a stationary component and a rotating component. The stationary component includes a stator accommodated in a housing with at least one base. The stator is in two halves of ferritic material separated by space and each provided with at least one 45° bevel. The rotating component includes an annular magnet accommodated in a holder and rotating around the stator with an airgap left between them.

An angle-of-rotation sensor of this genus is known from the WIPO Patent Publication No. WO A 95/14911, which is assigned to the present applicant. It comprises a stationary component and a rotating component that moves in relation to it. The stationary component has two mutually facing stator halves with space between them. Each stator half is a stack of sheetmetal disks secured against the bottom of the housing by a tensioning component. The rotating component includes an annular magnet accommodated in a holder.

There are drawbacks to this embodiment. The stacks are expensive to manufacture and secure. The magnet holder is designed such that the magnet is not magnetically insulated from a shaft that the rotating component is fastened to, contaminating the outgoing signals. Furthermore, the poles of the magnet are difficult to position properly with respect to the space between the stator halves while the sensor is being assembled.

SUMMARY OF THE INVENTION

The principal object of the present invention is accordingly to provide a more accurate angle-of-rotation sensor of the aforesaid genus that will be easier to manufacture and assemble. The stationary component in particular will be simpler, the magnet holder as magnetically insulating as possible, and the annular magnet reliably secured in the holder and easy to position precisely with respect to the space between the stator halves and the stationary component.

This object, as well as other objects which will become apparent from the discussion that follows, are achieved, in accordance with the present invention, in an angle of rotation sensor of the type described above, by the following features:

(a) the ferritic stator halves are sintered stator halves, with at least one holder secured in a stabilizing cutout in a baseplate of non-magnetic material;

(b) the magnet holder is a metal-injection molded holder with at least one partly magnetically insulating section and with at least one cut-out gap; and (c) the magnet is positioned in the holder by at least one cut-out gap and at least one matching web at a specified angle ($\alpha$) to the space.

The present invention has several advantages. Stators are easy to sinter, precise and stable. The complicated stacking procedure is eliminated. One particular advantage is that each sintered stator half can be fastened to the baseplate extremely accurately. The magnet holder can be cost effectively and, in particular, precisely fabricated by metal-injection molding (MIM). Complicated additional shaping, especially machining, of the material is unnecessary. The holder will hold the magnet exactly where it should be within precise tolerances. Measurements will be considerably more precise. The web or space will simultaneously position the magnet precisely in relation to the space during assembly. No complicated readjustments will be necessary. It will accordingly be possible to position the magnet's pole at a right angle, perpendicular that is, to the space between the two facing stator halves. If any angle other than a right angle is needed in special cases, it can be established ahead of time for all the angle-of-rotation sensors in the same series. Most significant, however, is that the magnet will be secured too tighty to turn.

Two alternative embodiments of the stator holders are possible. They can be either sintered bolts or sintered feet. Whether bolts or feet, they can terminate in a sintered cap. This feature ensures that the sintered stator half is secured, stationary, in the baseplate.

The baseplate can be a stator baseplate with at least one stabilizing cutout.

Two alternative embodiments of the stator baseplate are possible.

The stator baseplate can comprise the base of the stationary-component housing and have stabilizing cutouts with sintered stator halves fitting into it along with their feet and caps.

The stator baseplate can alternatively be a stabilizing disk with at least one stabilizing cutout and at least partly surrounded by a fastener with at least one fastening cutout.

At least the stabilizing disk can be at least partly surrounded by the base of the housing.

The second embodiment of the stabilizing cutouts and the fastening cutouts can be round or orange-segment shaped.

The stator baseplate can be aluminum, copper, or plastic.

The various embodiments of the baseplate can secure the sintered stator halves in two different ways.

In the first approach, the halves can be sintered to final dimension, finally positioned, and forced into the base of the housing as a whole. The essential advantage of this approach is the extremely cost-effective stabilization and fastening of the halves. The stationary component can accordingly be finally fabricated in only two basic steps.

In the second approach, the basic components of the stator are metal-injection molded of a ferritic material and the stator baseplate metal-injection molded, especially of aluminum, around the stator half. The resulting blank is removed from the mold and both the half and baseplate sintered in a furnace, both metals contracting. This process will ensure that the half fits into the baseplate, tight and precise, and cannot be displaced by even powerful forces.

The accordingly sintered molding is then inserted into a molded housing and secured therein, either resiliently or at least to some extent by encapsulation.

The housing and its base can be of plastic, preferably injection-molded to ensure that the stationary component constitutes a precisely dimensioned component of the sensor.

Two alternative embodiments of the metal-injection molded holder are possible.

It can be a cup metal-injection molded in one piece of magnetic material with an essentially round foot, at least two, preferably cylindrical stems rising out of one edge of the foot, and an essentially round and hollow bowl resting on the stems. A one-piece bowl is considerably less expensive to manufacture. Such a cup can be molded of magnetic material in a single mold. The molding will be 30 percent oversize and will need to be heated and sintered to its final dimensions. To allow at least extensive magnetic insulation of the cup from the components to be mounted on it, the stems can magnetically insulate the foot from the bowl.

The holder can alternatively be metal-injection molded in two parts, comprising an essentially straight-sided bowl with a round base of metal-injection molded of a non-magnetic material, provided in a second molding stage with a cylindrical wall of magnetic material. The resulting bi-material molding will be 30 percent oversize and will need to be more or less sintered to its final dimensions. The base and wall will accordingly be precisely dimensioned and will fit together perfectly tightly. The wall will be precisely positioned. The non-magnetic material of the base will ensure effective magnetic insulation from any components to be mounted on the bowl. One particular advantage is that the base of the bowl can be provided with a cutout that will readily accommodate a simply inserted valve shaft. This feature will compensate for the extra expense of two-part manufacture.

A gap can be cut out of the bowl in either embodiment. If the magnetic wall is provided with at least one matching web, the poles of the wall can be positioned at a right angle, perpendicular that is, to the space between the mutually facing stator halves. If, in a special case, the angle is to be other than a right angle, it can be precisely established for all the products in a single series.

The web or webs can be positioned near at least one of the joints between the south-north and the north-south segments of the annular magnet. The web will accordingly be positioned in an already existing uniform magnetic-field region and will not be able to move out of the magnet's field.

The webs can be of the same material as the magnetic component they are mounted on. They can alternatively be of plastic. Plastic is to be preferred when the magnetic component is to be fastened to the space between the stator halves without detriment to the magnetic field.

For a full understanding of the present invention, reference should now be made to the following detailed description of the preferred embodiments of the invention as illustrated in the accompanying drawings.

BRIEF DESCRIPTION OF THE DRAWINGS

FIG. 2b is a section along the line IIB—IIB through the stationary component illustrated in FIG. 2a.

FIG. 2c is a cross-sectional view, similar to FIG. 2b, of the stationary component with an attached lead frame.

FIG. 2d is a top view through the stationary component showing the attachment of the lead frame.

FIG. 2e is a cross-sectional view throughthe component of FIG. 2d.

FIG. 3b is a section along the line IIIB—IIIB through the stator baseplate illustrated in FIG. 3a.

FIG. 4a is a schematic illustration of another embodiment of a stationary component with the stator baseplate illustrated in FIGS. 3a and 3b.

FIG. 4b is a section along the line IVB—IVB through the stationary component illustrated in FIG. 4a.

FIG. 5b is a section along the line VB—VB through the magnet holder illustrated in FIG. 5a.

DESCRIPTION OF THE PREFERRED EMBODIMENT

The preferred embodiments of the present invention will now be described with reference to FIGS. 1–6 of the drawings. Identical elements in the various figures are designated with the same reference numerals.

Figure 1:
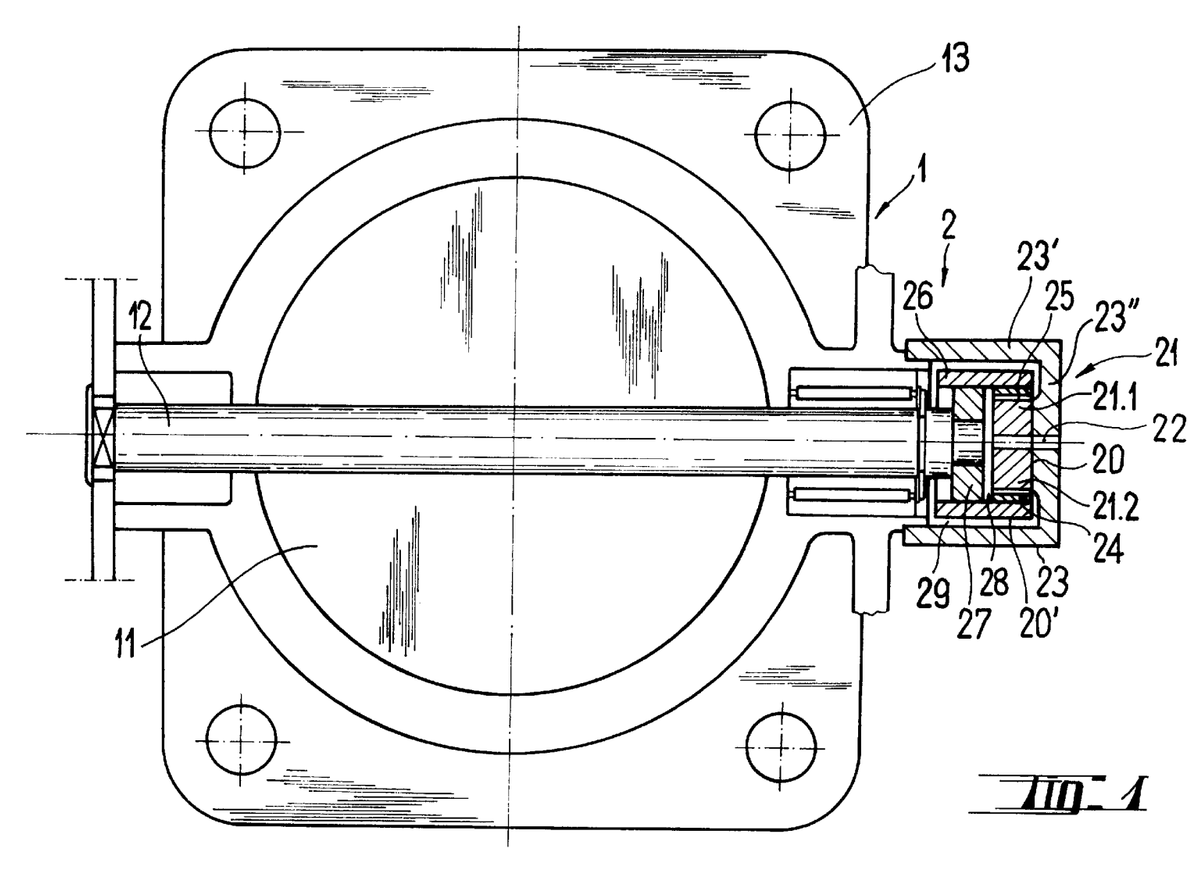
FIG. 1 is a schematic partly sectional view of a angle-of-rotation sensor coupled to a throttle valve.

The angle-of-rotation sensor 2 illustrated in FIG. 1 has a stationary component 20 comprising a stator 21 accommodated in a housing 23. Stationary component 20 is composed of two stator halves 21.1 and 21.2. Stator halves 21.1 and 21.2 are shaped like orange segments and separated by space 21". Their points are beveled, preferably 45°, at the end of space 21". Housing 23 has a base 23" and a cylindrical wall 23'.

As will be evident from FIG. 1, stationary component 20 is confronted by a rotating component 20'. Rotating component 20' includes an annular magnet 24 accommodated in a holder comprising a magnet-securing component 26 and a disk-shape spacer 27. Spacer 27 is directly connected to a throttle-valve shaft 12. Spacer 27 and stator 21 are separated, once sensor housing 23 has been secured to a housing 13 by a gap 28 and rotation angle apparatus 1 in FIG. 1. Cylindrical wall 23' and magnet-securing component 26 are separated by another gap 29. Magnet-securing component 26 and the annular magnet 24 accommodated therein accordingly constitute in conjunction with spacer 27 a rotor component that can rotate protected inside sensor housing 23.

Once the individual components of rotating component 20' have been properly adjusted and aligned in relation to throttle-valve shaft 12, sensor housing 23 is thrust over magnet-securing component 26 along with stator halves 21.1 and 21.2 and a Hall-effect component 22 accommodated in space 21", leaving an airgap 25 and gaps 28 and 29. Sensor housing 23 is then fastened by its cylindrical wall 23' to valve housing 13. If the joint between sensor housing 23 and valve housing 13 needs to be sealed, sensor housing 23 will also act as a protective jacket. The whole angle-of-rotation sensor 2 will accordingly be protected against such external conditions as the very high heat in an engine compartment and the effects of oil, water, etc.

Figure 2A:
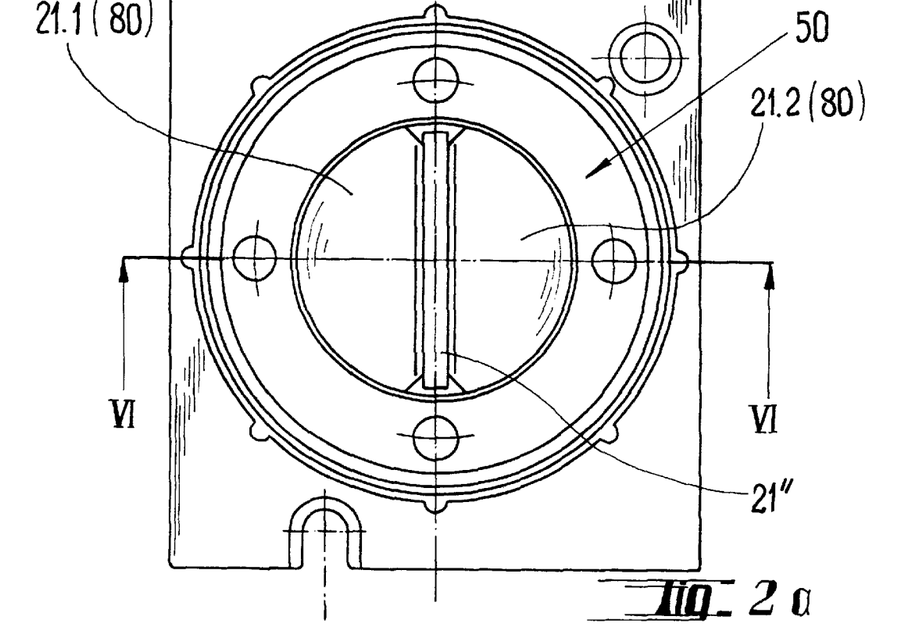
FIG. 2a is a schematic top view of the stationary component of the angle-of-rotation sensor illustrated in FIG. 1.
Figure 2B:
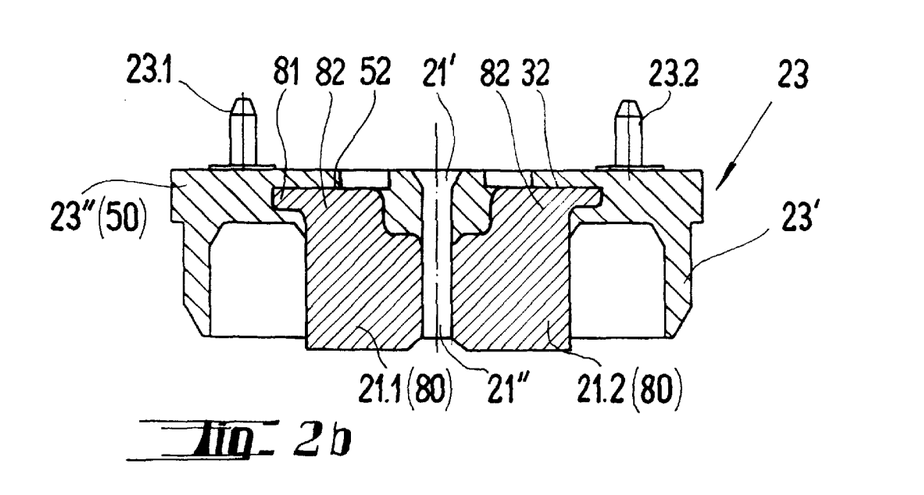

FIGS. 2a and 2b illustrate one embodiment of the stationary component 20 in angle-of-rotation sensor 2. The stator halves 21.1 and 21.2 are sintered stator halves 80, individually metal-injection molded of a ferritic material and sintered. Since halves 80 are of the same shape, they can be fabricated continuously and sintered synchronized in batches in a furnace. Each accordingly fabricated sintered stator half 80 will be provided with a foot 82 that merges into a cap 81 which is secured in a stabilizing cutout 32 in a baseplate 30 of non-magnetic material, and with a shoulder 85.

Each sintered stator half 80 will have, along with the aforesaid bevels 84, a longitudinal bevel 83, also of 45°.

Two such sintered stator halves 80 can be accommodated in a single mold separated by a space 21", acting as a baseplate in base 23" while the plastic sensor housing 23 is being molded. This procedure leaves stabilizing cutouts 52(32) in base 23" to accommodate feet 82. Caps 81 are also secured in base 23". Stator halves 21.1 and 21.2 are both surrounded by cylindrical wall 23' when sensor housing 23 is molded. Stabilizing components 23.1 and 23.2 each act to stabilize the apparatus by allowing the apparatus to afix itself to a corresponding female groove, while 21' (FIG. 2b is consistent with FIG. 1) also allows the apparatus to be afixed, by a corresponding male attachment.

The particular advantage of such a stationary component 20 is that both sensor housing 23 and holders and stops for stator halves 21.1 and 21.2 in the form of sintered stator halves 80 can simultaneously be produced in a separate molding process, considerably decreasing manufacturing costs and keeping the height of stationary component 20 to a minimum.

Another advantage is that Hall-effect component 22 can be positioned in the vicinity of the densest magnetic flux near the parallel and facing surfaces of sintered stator halves 80, while longitudinal bevels 83 concentrate the flux. The enlarged space between the two sintered stator halves 80 between the facing feet 82 in the vicinity of space 21" keeps the flux less dense. The transverse bevels 84 balance the flow at the orange-segment shaped stator halves due to the absence of edges.

Figure 3A:
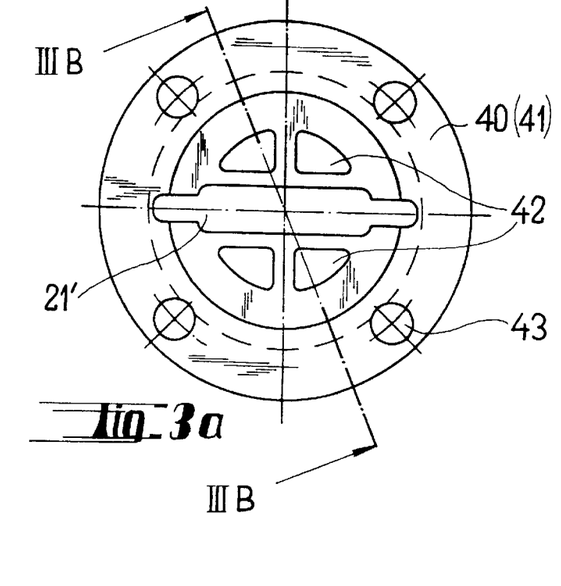
FIG. 3a is a schematic top view of the stator baseplate in another embodiment of the angle-of-rotation sensor illustrated in FIG. 1.
Figure 3B:
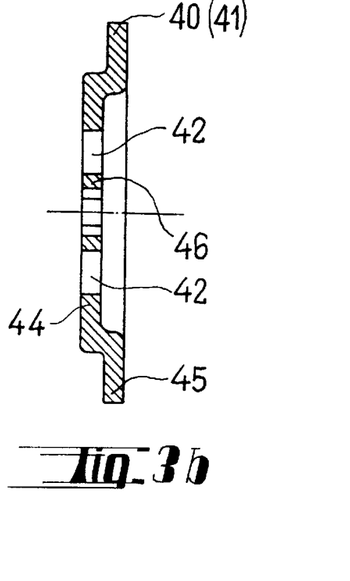

FIGS. 3a, 3b. 4A, and 4b illustrate another embodiment of stationary component 20.

This embodiment has a stator baseplate 40 of sintered aluminum. It consists of a stabilizing disk 44 that merges into an annular fastener 45. Stabilizing disk 44 has a central cutout 21' with tapering ends and confronted by two stabilizing cutouts 42 shaped like orange segments. The are demarcated from central cutout 21' by a cutout web 46. Annular fastener 45 includes two pairs of mutually facing fastening cutouts 43 in the form of bores.

Figures 4A, 4B:
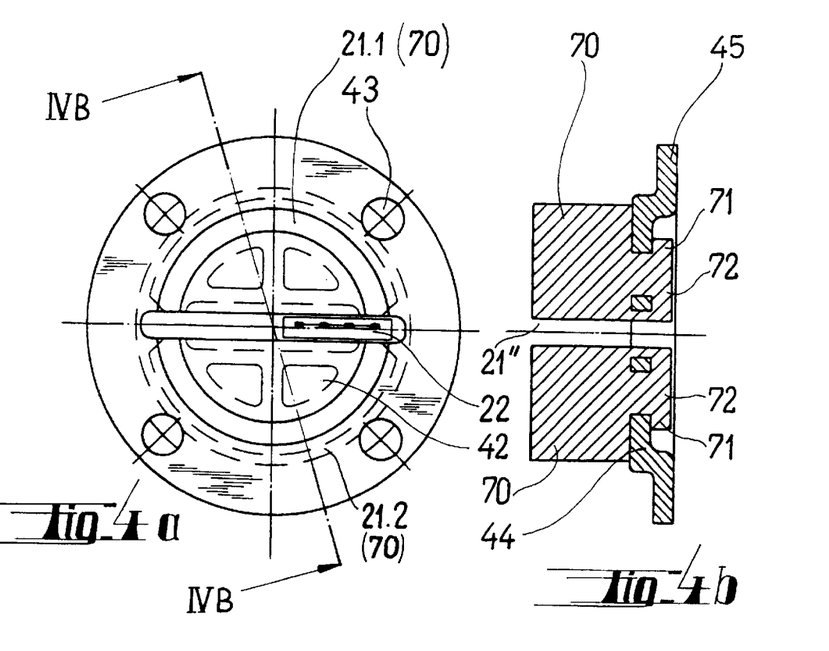

Stator halves 21.1 and 21.2 in the form of sintered halves 70 of a ferritic material are sintered facing each other to the stabilizing disk 44 in the accordingly fabricated stator baseplate 40. A stabilizing foot 72 is sintered into each sintered stator half 70 as part of the process. The sintered stabilizing foot 72 merges into a sintered securing cap 71, anchoring the stator half into an aluminum baseplate 41 and securing it thereon. The central cutout 21' between the two halves is as wide as its length in baseplate 41.

This second embodiment is outstanding for strength. Sintered stator baseplate 40 secures sintered stator halves 70 so effectively that they can resist any static or dynamic force. Stator baseplate 40 is then inserted into a sensor housing 23 already fabricated as hereinbefore specified or otherwise.

Figure 5A:
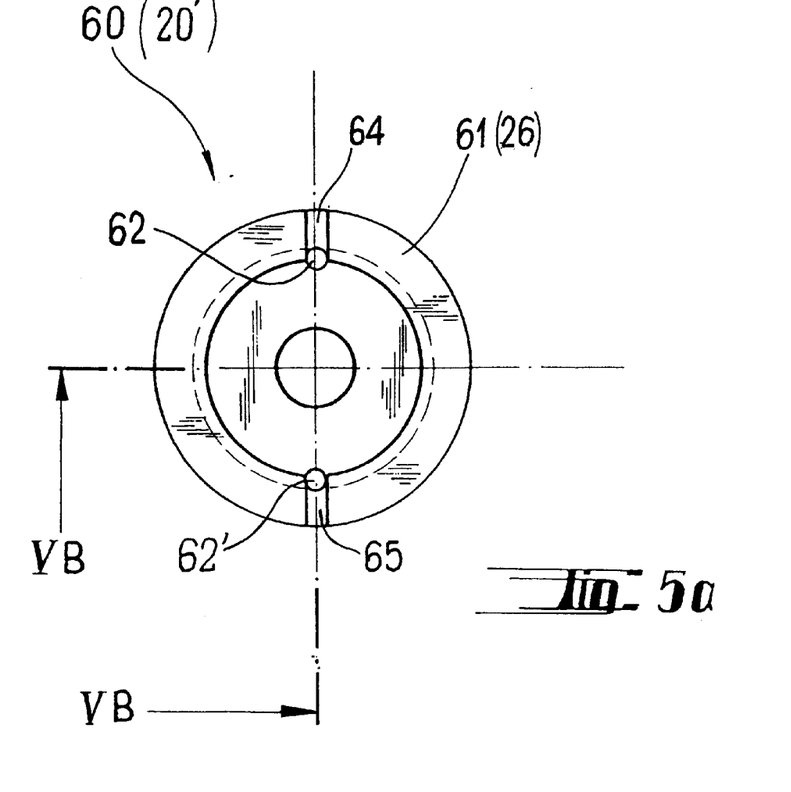
FIG. 5a illustrates a magnet holder for the rotating component in the angle-of-rotation sensor illustrated in FIG. 1.
Figure 5B:
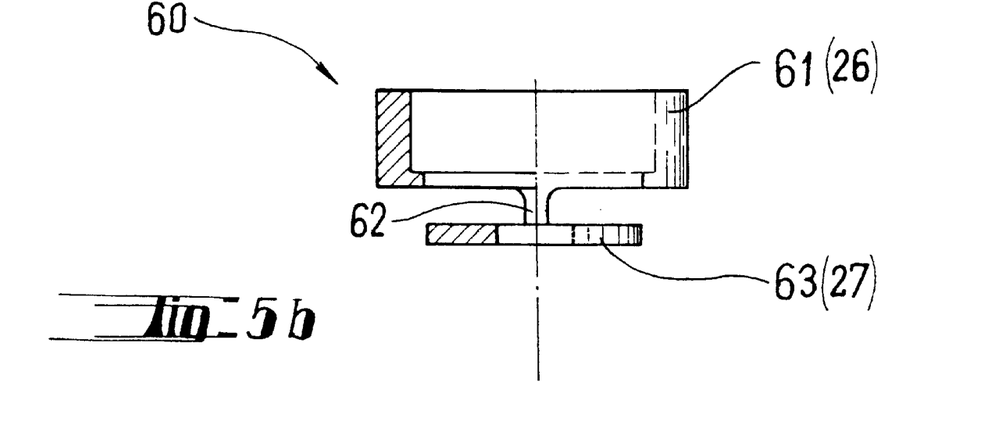

FIGS. 5a and 5b illustrate a magnet-securing component 26, in this case bowl 61, which together with disk-shaped foot 63 and two stems 62 and 62' constitute the entire cup 60.

Cup 60 consists of a disk-shaped foot 63 with two stems 62 and 62' extending out of it and supporting a bowl 61.

Mutually facing gaps 64 and 65 have been cut out of bowl 61.

According to the present invention cup 60 is preferably metal-injection molded of a magnetic material in the form of X12CrMol7Si steel. This steel does not corrode and is injected into a mold. The molding is heated in an furnace in a process similar to sintering, reducing the volume of the cup by 30% to its final dimensions.

The bowl 61 in this embodiment constitutes magnet-securing component 26, and foot 63 spacer 27. Stems 62 and 62' connect magnet-securing component 26 to spacer 27 and at least extensively insulate them magnetically from each other.

Figure 5C:
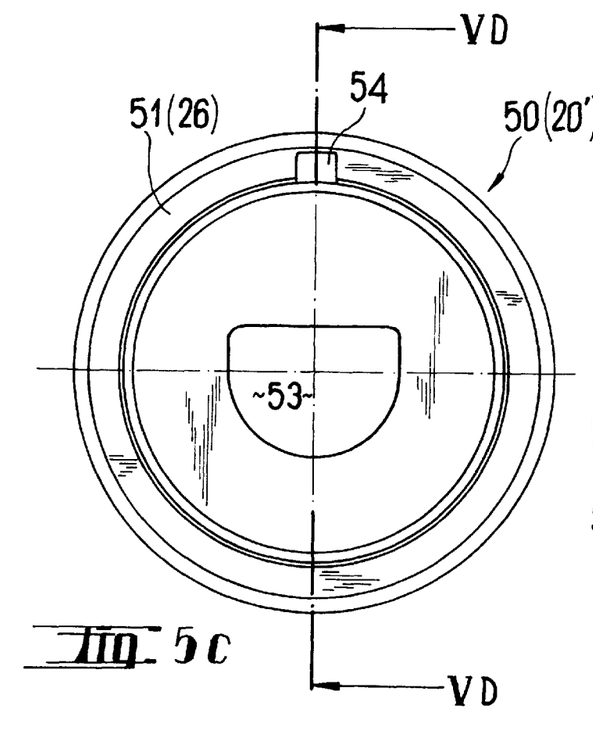
FIG. 5c illustrates another embodiment of a magnet holder for the rotating component of the angle-of-rotation sensor illustrated in FIG. 1.
Figure 5D:
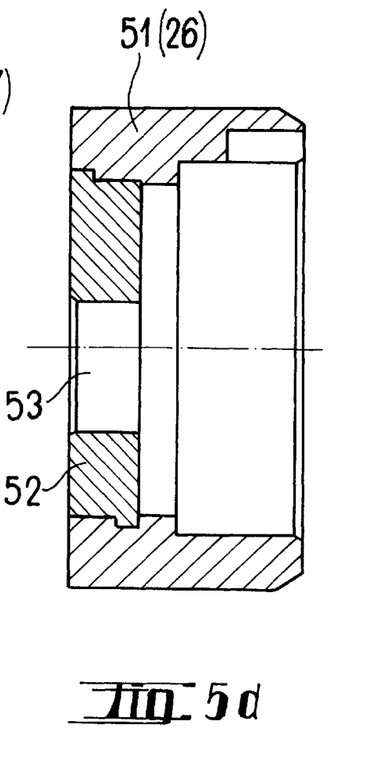
FIG. 5d is a section along the line VD—VD through the magnet holder illustrated in FIG. 5c.

FIGS. 5c and 5d illustrate another embodiment of a magnet holder in the form of magnet securing component 26, in this case cylindrical wall 51 of metal-injection molded and sintered bowl 50. This bowl 50, which is rotating component 20', has cutout 53 and cutout gap 54.

Bowl 50 is metal-injection molded in two parts. Its non-magnetic base 52 is molded of X2CrNi1911 steel along with such additives as wax. A cylindrical wall of powdered X12CrNiSi7 steel is then injected around it, also combined with such additives as wax in another mold.

The resulting metal-injection molded blank is then at lest partly washed free of the additives, especially the wax, and "baked" at approximately 1000° down to its final dimensions, approximately 30 percent of its original dimensions, in a process similar to sintering.

Although metal-injection molding (MIM) is in itself known, using it to fabricate parts like the two embodiments of a magnet holder specified herein is not.

As specified hereintofore with reference to FIG. 1, angle-of-rotation sensor 2 has a component 20' in the form of an annular magnet 24 that rotates around stationary component 20.

Figure 6:
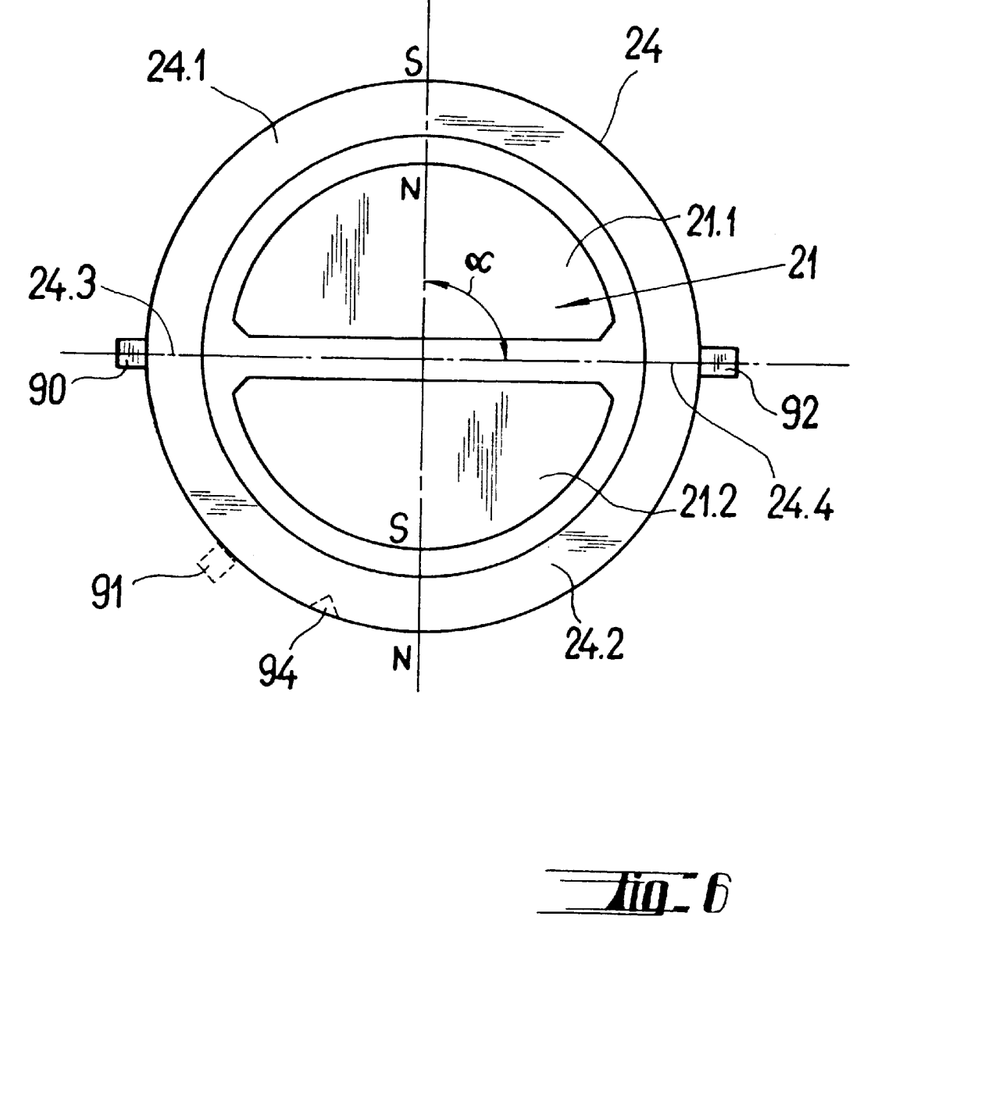
FIG. 6 is a schematic top view of the space inside the stator in the adjustable magnet in the angle-of-rotation sensor illustrated in FIG. 1.

In FIG. 6, mutually facing webs 90 and 92, which position the magnet precisely in relation to the space during assembly, can be made of the same material as the magnetic component they are mounted on, or of plastic, and are here mounted on annular magnet 24, which comprises north-south segment 24.1 and south-north segment 24.2. The interior of one segment is north-poled and its exterior south-poled, the interior of the other is south-poled and its exterior north-poled. The overall magnet is accordingly radially two-poled and acts like a bar magnet. The magnetic flux is radial in the areas labeled N and S. The only field irregularities are at interfaces 24.3 and 24.4, and the webs are situated in those magnetically neutral regions. The device may on the other hand have only one web 90 or even several webs 91. Annular magnet 24 can also be provided with a cut-out gap 94 which aids in stabilization.

The radially two-pole annular magnet 24 must be positioned at a specified angle α, 90° in the illustrated embodiment, to the two mutually facing halves 21.1 and 21.2 of stator 21, which as hereintofore specified, are in the form of fixed sintered stator halves 70 and 80.

In FIG. 6 one of the webs is utilized to establish annular magnet 24 in the gap 54 cut out of bowl 50 at angle α.

Additionally in FIG. 6 both webs 90 and 92 are utilized to establish annular magnet 24 in cut-out gaps 64 and 65 at angle α.

It should be emphasized that the webs and matching cut-out gaps allow simple and extremely precise positioning of annular magnet 24. No complicated re-adjustments are necessary. It is essential to the present invention that annular magnet 24 cannot turn inside base 52 or wall 51. Even the most powerful forces cannot displace or remove the magnet.

There has thus been shown and described a novel rotation angle sensor which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In an angle-of-rotation sensor with a stationary component and a rotating component, wherein the stationary component includes a stator, the stator is in two halves of ferritic material separated by space, and the rotating component includes an annular magnet accommodated in a magnet holder rotating around the stator with an airgap between them, the improvements wherein the ferritic stator halves are sintered stator halves, each said stator half being held by a stator holder, each said stator holder being secured in a stabilizing cutout in a baseplate of non-magnetic material, and wherein the magnet holder is metal-injection molded.

2. The angle-of-rotation sensor defined in claim 1, wherein the stator holders are sintered.

3. Angle-of-rotation sensor defined in claim 1, wherein the baseplate is a stator baseplate with at least one stabilizing cutout.

4. Angle-of-rotation sensor defined in claim 1, wherein the stator baseplate comprises the base of a stationary-component housing and has stabilizing cutouts with sintered stator halves forced into said stabilizing cutouts.

5. Angle-of-rotation sensor defined in claim 1, wherein the stator baseplate is a stabilizing disk with at least one stabilizing cutout and is at least partly surrounded by an annular fastener with at least one fastening cutout, and is surrounded by the base of the stationary component housing, whereby the sintered stator half is fastened to the stator baseplate such that the baseplate rests at least partly against the stabilizing disk.

6. Angle-of-rotation sensor defined in claim 5, wherein the stabilizing disk is partly surrounded by the base of the stationary component housing.

7. Angle-of-rotation sensor defined in claim 1, wherein the stabilizing cutouts and the fastening cutouts are round or orange-segment shaped.

8. Angle-of-rotation sensor defined in claim 5, wherein the stator baseplate is aluminum, copper, or plastic.

9. Angle-of-rotation sensor defined in claim 4, wherein the base of the housing is of plastic, preferably injection-moldable plastic.

10. Angle-of-rotation sensor defined in claim 2, wherein the holder is a cup metal-injection molded in one piece of magnetic material with an essentially round foot, a magnetically insulating section in the form of at least two, preferably cylindrical stems rising out of one edge of the foot, and an essentially round and hollow bowl resting on the stems.

11. Angle-of-rotation sensor defined in claim 2, wherein the holder is metal-injection molded in two parts, comprising an essentially straight-sided bowl with a magnetically insulating section in the form of a round base metal-injection molded of a non-magnetic material with a cylindrical wall of magnetic material around it.

12. Angle-of-rotation sensor defined in claim 11, wherein the bowl and the wall are provided with at least one cut-out gap.

13. Angle-of-rotation sensor defined in claim 11, wherein the annular magnet is provided with at least one web that engages one of the cut-out gaps in the wall or bowl.

14. Angle-of-rotation sensor defined in claim 13, wherein the web or webs is or are positioned near at least one of the joints between the south-north and the north-south segments of the annular magnet.

15. Angle-of-rotation sensor defined in claim 13, wherein the webs is either of the same material as the magnet they are mounted on or of plastic.

16. Angle-of-rotation sensor defined in claim 11, wherein the magnetic material employed for the wall is a ferrite, especially X12CrNiSi7 steel, that includes at least chrome and nickel.

17. Angle-of-rotation sensor defined in claim 11, wherein the non-magnetic material employed for the base is a ferrite, especially X2CrNi1911 steel, that includes at least chrome and nickel.

* * * * *